Oct. 24, 1961  J. R. PIERSON  3,005,383
RETRACTIBLE REAR-VIEW APPARATUS FOR VEHICLES
Filed March 2, 1959
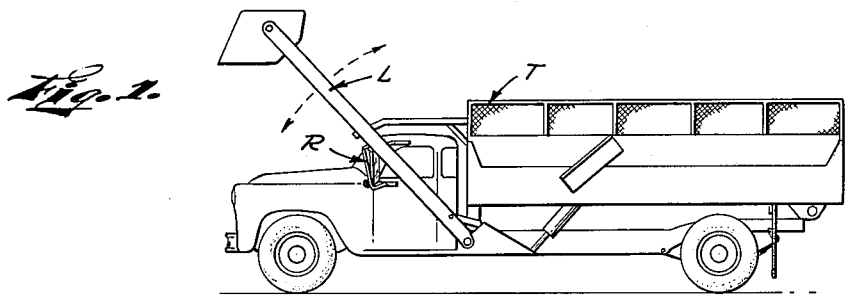
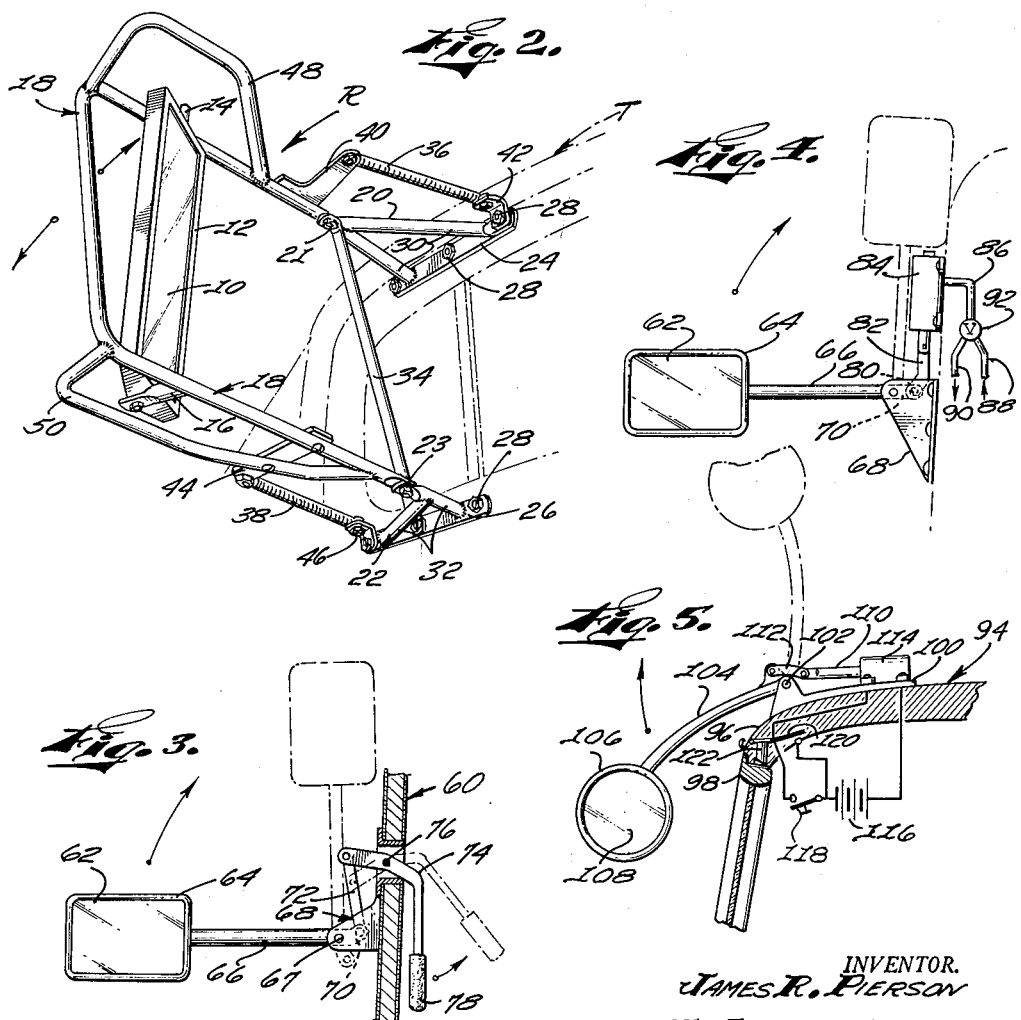
INVENTOR.
JAMES R. PIERSON
BY FULWIDER, MATTINGLY
HUNTLEY
ATTORNEYS

United States Patent Office 3,005,383
Patented Oct. 24, 1961

3,005,383
RETRACTIBLE REAR-VIEW APPARATUS
FOR VEHICLES
James R. Pierson, 3627 Elizabeth St., Compton, Calif.
Filed Mar. 2, 1959, Ser. No. 796,377
3 Claims. (Cl. 88—93)

The present invention relates to a rear-view apparatus for vehicles, and more particularly to a rear-view apparatus which is movable from a normal position in which the apparatus might be an obstruction.

Motor vehicles are normally equipped with a rear-vision mirror that is mounted inside the vehicle to provide a view through the rear window of the vehicle. However, mirrors of this type provide the operator only a limited field of vision and, therefore, side mirrors mounted outside of the vehicle have come into widespread use.

For a side-mounted mirror to provide a broad field of vision, it is desirable to mount the mirror in a position some distance away from the vehicle. However, a side-mounted rear-view apparatus which protrudes from a vehicle to any extent presents an obstacle on the vehicle. For example, in heavy traffic, an extending rear-view apparatus would be quite dagerous. Also, in many instances, it is desirable to mount a rear-view apparatus in a location which would obstruct the movement of a door or other member of a vehicle. Therefore, rear-view side-mounted apparatus have generally been designed by compromising between the extent of protrusion and the field-of-vision provided.

In general, the present invention comprises a rear-view apparatus adapted to be externally mounted upon a motor vehicle so as to extend away from the vehicle a sufficient distance to provide a broad field of vision. The apparatus is mounted to be movable from an extending position. The movement of the apparatus may be controlled manually or automatically in accordance with the operation of the vehicle, as for example, the opening or closing of a door.

An object of the present invention is to provide an improved rear-view apparatus for motor vehicles.

Another object of the present invention is to provide a rear-view apparatus which affords a broad field of vision to the operator of a motor vehicle.

Still another object of the present invention is to provide a rear-view apparatus capable of affording a broad field of vision which apparatus is readily movable from an obstructing location.

A further object of the present invention is to provide a rear-view externally-mounted apparatus extending a substantial distance from a motor vehicle and being pivotally movable to an unobstructing position.

Still a further object of the present invention is to provide a rear-view externally-mounted apparatus for use upon a motor vehicle, the position of which apparatus is automatically controlled in accordance with the movement of other parts of the motor vehicle, e.g. doors.

These and other objects and advantages of the present invention will become apparent from the following detailed description thereof, when taken in conjunction with the appended drawings, wherein:

FIGURE 1 is a perspective view of a motor vehicle with a rear-view apparatus of the present invention mounted thereon;

FIGURE 2 is an enlarged perspective view of the rear-view apparatus of FIGURE 1.

FIGURE 3 is a perspective and diagrammatic view of another form of rear-view apparatus in accordance with the present invention;

FIGURE 4 is a perspective and diagrammatic view of still another form of rear-view apparatus in accordance with the present invention; and FIGURE 5 is a perspective view of still a further form of rear-view apparatus in accordance with the present invention.

Referring initially to FIGURE 1, there is shown a truck T having a movable loading apparatus L, the movement of which is obstructed by a rear-view apparatus R, when the apparatus R is in its normal extended position. The rear-view apparatus R is pivotally-mounted upon the truck T and carries cam surfaces which are engaged by the loading apparatus L to displace the rear-view apparatus R and accommodate the movement of the loading apparatus L.

Considering the rear-view apparatus R of FIGURE 1 in greater detail, reference will now be had to the enlarged showing in FIGURE 2. The rear-view apparatus incorporates an elongate rectangular mirror 10, which is mounted in a metal frame 12. The frame 12 is mounted in a vertical position on extensions 14 and 16 affixed at the center of the ends of the frame 12, so that the mirror 10 is pivotally-movable about its longitudinal center.

The extensions 14 and 16 are affixed to the legs of a U-shaped tubular member 18 so that the mirror 10 is substantially surrounded by the U-shaped member 18. The ends of the U-shaped member are pivotally-attached to mounting brackets 20 and 22 which are in turn affixed to the door of the truck T. The mounting brackets 20 and 22 are similar and include flat steel members 24 and 26, respectively, which contain bores to receive bolts, e.g. bolts 28, to be affixed upon the truck T. The member 24 has tubular sections 30 affixed thereto, as by welding, to form the triangular bracket 20. Similarly, the member 26 has sections 32 affixed thereto to form the triangular bracket 22.

The bracket 20 is horizontally supported by a bar 34 extending between the flat member 26 and the bracket 20. The ends of the tubular U-shaped member 18 are flattened and pivotally affixed respectively to the ends of the mounting brackets 20 and 22 by bolts 21 and 23. The U-shaped member is maintained in a position extending out from the truck T by coil springs 36 and 38 which extend from opposite sides of the U-shaped member to the brackets 20 and 22, respectively, to exert opposite forces upon the U-shaped member 18. Specifically, the spring 36 is affixed to the upper leg of the U-shaped member 18 by a bracket 40 and to the member 24 by an angular connector 42. The spring 38 is affixed to the lower leg of the U-shaped member 18 by a bracket 44, and to the bracket 22 by an angular connector 46.

The upper leg of the U-shaped member has a horizontally-mounted tubular cam bar 48 affixed thereto, as by welding, for engaging the loading apparatus L to move the rear-view apparatus R forward and permit the loading apparatus to be lowered. Similarly, the lower leg of the U-shaped member has a tubular cam bar 50 affixed thereon to be engaged by the loading apparatus L as it is moved upward so as to move the rear-view apparatus R out of position. Thus, as the loading apparatus L is lowered from a raised position above the truck T, it engages the cam bar 48 forcing the U-shaped member 18 forward and placing the spring 36 in tension. After the loading apparatus L has passed the rear-view apparatus R, the spring 36 compresses returning the U-shaped member to a normal extending position from which a wide field of vision is provided to the motor-vehicle operator. Similarly, when the loading apparatus L is raised from its lower position it engages the cam bar 50 moving the rear-view apparatus R rearwardly in a pivotal fashion, thereby stressing the coil spring 38. Of course after the loading apparatus passes the rear-view apparatus R, the coil spring 38 returns the rear-view apparatus to the normal position.

It may therefore be seen that the apparatus provides a wide field of vision for the operator of the truck T and yet is not an obstruction to the movement of the loading apparatus L, but rather is displaced from its normal position by the loading apparatus L and thereafter returned to the normal position.

Referring now to FIGURE 3, there is shown a rear-view apparatus mounted upon a vehicle, a portion of which vehicle is shown in cross-section. The rear-view apparatus of FIGURE 3 may be manually moved from the normal position in which the apparatus might be an obstruction as in heavy traffic. The rear-view apparatus includes a mirror 62 mounted in a frame 64 which is supported on a bar 66 that extends away from the vehicle 60. The frame 64 may be affixed to the bar 66 by a universal joint (not shown) to permit adjustment of the mirror 62. The end of the bar 66 that is remote from the mirror 62 is pivotally-locked to a mounting bracket 68 by a pin 67 to allow upward movement of the mirror 62. A portion 70 of the bar 66 extends inward from the pin 67 and is pivotally connected to a link 72 which in turn is pivotally-connected to a lever 74. The lever 74 is pivotally-mounted by a pin 76 affixed in the vehicle 60.

During normal use of the vehicle, the mirror 62 remains in a lowered position as shown; however, in heavy traffic or other situations wherein the mirror might be an obstacle, the handle 78 of the lever 74 is raised to a clear position (as shown in phantom), to thereby move the link 72 downwardly and pivotally move the bar 66 upwardly, raising the mirror 62 to a non-obstructing position, in which it is held by the friction of the linkages.

Referring now to FIGURE 4, there is shown a rear-view apparatus similar to that of FIGURE 3, in which like parts are identified by the same reference numerals; however, the apparatus of FIGURE 4 is power-operated. In the apparatus of FIGURE 4, the extension 70 of the bar 66 is pivotally-attached by a pin 80 to a plunger 82 mounted in a hydraulic cylinder 84. The hydraulic cylinder is connected to a hydraulic line 86 which is in turn connected to a high-pressure line 88 and a discharge line 90. The junction point between the line 86 and the lines 88 and 90 contains a valve 92 which functions to connect the line 86 alternately to the pressure line 88 or the discharge line 90. The valve 92 may be positioned inside the motor vehicle in a location conveniently operated by the driver. Therefore, in the event that the line 90 is connected to the line 88, the mirror 62 is positioned to provide a broad field of vision for the motor-vehicle operator; however, by changing the position of the valve 92, so that the line 88 is connected to the line 86, hydraulic fluid is caused to flow into the cylinder 84 forcing the plunger 82 downwardly and pivotally raising the mirror 62 to the position shown in phantom. At a time when the mirror 62 need no longer be raised to an unobstructing position, the valve 92 is changed in position to connect the line 86 to the line 90, thereby allowing the weight of the mirror 62 and the frame 64 to raise the plunger 82 through frictionless linkages and discharge the hydraulic fluid through the lines 86 and 90 to the hydraulic reservoir of the associated vehicle.

Referring now to FIGURE 5, there is shown a portion of a vehicle 94 in cross-section. The fragment of the vehicle 94 as shown includes the top 96 and a door 98. A rear-view apparatus is affixed upon the top 96 by a bracket 100 which supports a pin 102 pivotally-holding an arm 104, the end of which carries a frame 106 mounting a mirror 108. The arm 104 is connected to a plunger 110 by a link 112. The plunger 110 operates in conjunction with the solenoid coil 114 which is affixed upon the bracket 100 and incorporates a protective cover. The coil 114 is electrically connected in a series circuit including a battery 116 and parallel switches 118 and 120. The switch 118 is a manually-operated switch positioned at a convenient location for operation by the driver. The switch 120 mounted adjacent the door 98 is operated by a plunger 122 which carries a cam surface engaged by the door 98. That is, upon closure of the door 98, the plunger 122 is elevated to open the switch 120; however, upon opening the door 98, the plunger 122 drops, closing the switch 120.

The mirror 108 which obstructs the door 98 is also automatically raised to an unobstructing position when the door 98 is open. That is, upon opening the door 98 the plunger 122 drops to close the switch 120, which energizes the solenoid 114 thereby withdrawing the plunger 110 and lifting the mirror to the position indicated in phantom. Of course, the mirror may be similarly raised by manual closure of the switch 118 to energize the solenoid 114.

An important feature of the present invention resides in the provision of a rear-view apparatus which is located in a position to provide the optimum field-of-vision to the operator of a vehicle and which apparatus is movable to an unobstructing location when a need arises for such movement.

From the foregoing it will be apparent to those skilled in the art that the present invention provides a greatly improved and satisfactory rear-view apparatus fully capable of achieving the objects and advantages herein set forth. It will be apparent, however, that variations may be made in the rear-view apparatus without departing from the novel features thereof. Consequently, the present invention is not to be limited to the particular arrangement herein shown and described as defined by the appended claims.

I claim:

1. A rear view apparatus for use on a vehicle, said vehicle having a loading arm that undergoes movement in a vertical plane alongside the cab of said vehicle, comprising: a vehicle attachment frame secured to said vehicle; a mirror supporting frame movably carried by said vehicle attachment frame; a rear view mirror supported by said mirror supporting frame, said mirror normally being disposed in said vertical plane; spring means interposed between said vehicle attachment frame and said mirror supporting frame biasing the latter to its normal position wherein said mirror is disposed in said vertical plane; and cam bar means on said mirror supporting frame that are engaged by said loading arm as it undergoes said movement in said vertical plane to thereby temporarily urge said mirror supporting frame out of its normal position, said spring means returning said mirror supporting frame to its normal position when said loading arm and cam bar means are disengaged.

2. Apparatus as set forth in claim 1 wherein said mirror supporting frame is pivoted to said vehicle attachment frame for swinging movement in a generally horizontal plane.

3. Apparatus as set forth in claim 2 wherein said cam bar means include a rearwardly extending curved bar on the upper rear portion of said mirror supporting frame and a forwardly extending curved bar on the lower front portion of said mirror supporting frame.

References Cited in the file of this patent

UNITED STATES PATENTS

| 718,309 | Brown | Jan. 13, 1903 |
| 2,724,996 | O'Shei | Nov. 29, 1955 |
| 2,854,893 | Henshall | Oct. 7, 1958 |